United States Patent
Zuckerman et al.

(10) Patent No.: US 8,296,358 B2
(45) Date of Patent: Oct. 23, 2012

(54) METHOD AND SYSTEM FOR JOURNALING DATA UPDATES IN A DISTRIBUTED FILE SYSTEM

(75) Inventors: Boris Zuckerman, Marblehead, MA (US); Alex Osinsky, Boxborough, MA (US); Alexander Epstein, Reading, MA (US); Vitaly M. Oratovsky, Newton, MA (US); Yevgeniy Dashevsky, Bedford, MA (US); Dinesh Venkatesh, Westford, MA (US); Milan Shetti, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 12/685,237

(22) Filed: Jan. 11, 2010

(65) Prior Publication Data
US 2010/0293137 A1 Nov. 18, 2010

Related U.S. Application Data

(60) Provisional application No. 61/216,194, filed on May 14, 2009.

(51) Int. Cl.
*G06F 15/16* (2006.01)
(52) U.S. Cl. ........ 709/203; 709/201; 709/202; 709/217; 709/218; 709/219; 709/226; 709/229
(58) Field of Classification Search .................. 709/201, 709/202, 203, 217, 218, 219, 226, 229
See application file for complete search history.

(56) References Cited

U.S. PATENT DOCUMENTS

| | | | |
|---|---|---|---|
| 6,782,389 B1 | 8/2004 | Chrin | |
| 7,266,722 B2 | 9/2007 | Kingsbury | |
| 7,430,570 B1 | 9/2008 | Srinivasan | |
| 7,437,386 B2 | 10/2008 | Callahan | |
| 7,464,125 B1 | 12/2008 | Orszag | |
| 7,546,319 B1 | 6/2009 | Srinivasan | |
| 7,650,341 B1 | 1/2010 | Oratovsky | |
| 2001/0049620 A1* | 12/2001 | Blasko | 705/10 |
| 2003/0212739 A1* | 11/2003 | Boucher et al. | 709/203 |
| 2006/0101153 A1* | 5/2006 | Boucher et al. | 709/232 |
| 2006/0184510 A1* | 8/2006 | Nishio | 707/3 |
| 2006/0288080 A1 | 12/2006 | Orszag | |
| 2007/0226331 A1 | 9/2007 | Srinivasan | |
| 2008/0222223 A1 | 9/2008 | Srinivasan | |
| 2009/0012932 A1* | 1/2009 | Romem et al. | 707/2 |

OTHER PUBLICATIONS

Alkhatib, Ghazi, et al., "Transaction Management in Distributed Database Systems: the Case of Oracle's Two-Phase Commit," Journal of Information Systems Education, 2002, vol. 13, No. 2, pp. 95-104.

* cited by examiner

*Primary Examiner* — Liangche A Wang (57) ABSTRACT

An exemplary embodiment of the present invention provides a method of processing a file system transaction in a distributed file system. The method includes receiving a transaction request from a computer, wherein the transaction request includes file data to be stored and a first segment identifier that determines a destination of the file data. The method also includes generating a first distributed journal record corresponding to the file data. The method also includes generating a first file operation request based, at least in part, on the transaction request. The method also includes sending the first file operation request to a first segment server corresponding to the first segment identifier, wherein the first segment server generates a second distributed journal record corresponding to the file data on a memory device associated with the first segment server.

17 Claims, 7 Drawing Sheets

METHOD AND SYSTEM FOR JOURNALING DATA UPDATES IN A DISTRIBUTED FILE SYSTEM

This application claims the benefit of U.S. Provisional Application No. 61/216,194, filed on May 14, 2009, which is incorporated herein by reference in its entirety for all purposes.

BACKGROUND

Data generated and used by computers is stored in file systems. As computer interconnects become more robust, networked computers can store and share data on a file server of the LAN. To improve scalability of large-scale storage systems, distributed file systems have been developed. A distributed file system is a file system in which files are distributed across more than one file server, each file server having its own physical storage media. Distributed file systems enable storage capacity to be easily added within the same file system, are easy to administer and manage, and perform effectively with very large storage capacity and client loads. In any file system, inconsistencies can occur when modifying operations are interrupted due to hardware failure. Traditional file journaling methods are insufficient for maintaining file system consistency in distributed file systems.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for maintaining file system consistency in a distributed file system. As used herein, the term "distributed file system" refers to a file system in which a set of files or a single file may be distributed across storage media controlled by more than one file server and in which the storage controlled by the several servers is combined into a common logical name space from the perspective of the client computers. In some exemplary embodiments, the file system may include a server referred to herein as a "portal" which provides client access to the distributed file system. To maintain file system consistency, a distributed journaling system is employed. In exemplary embodiments of the present invention, the distributed journaling system maintains file system consistency by generating a portal-side journal, and one or more redundant server-side journals. When a server has successfully flushed its server-side journal to storage, the server may send a "finished" message to the portal. The transaction may be completed when the portal receives "finished" messages from all of the involved servers and instructs each server to commit its server-side journal. The file system may also include a self-healing module that verifies and repairs file system errors caused by hardware interruptions.

Figure 1:
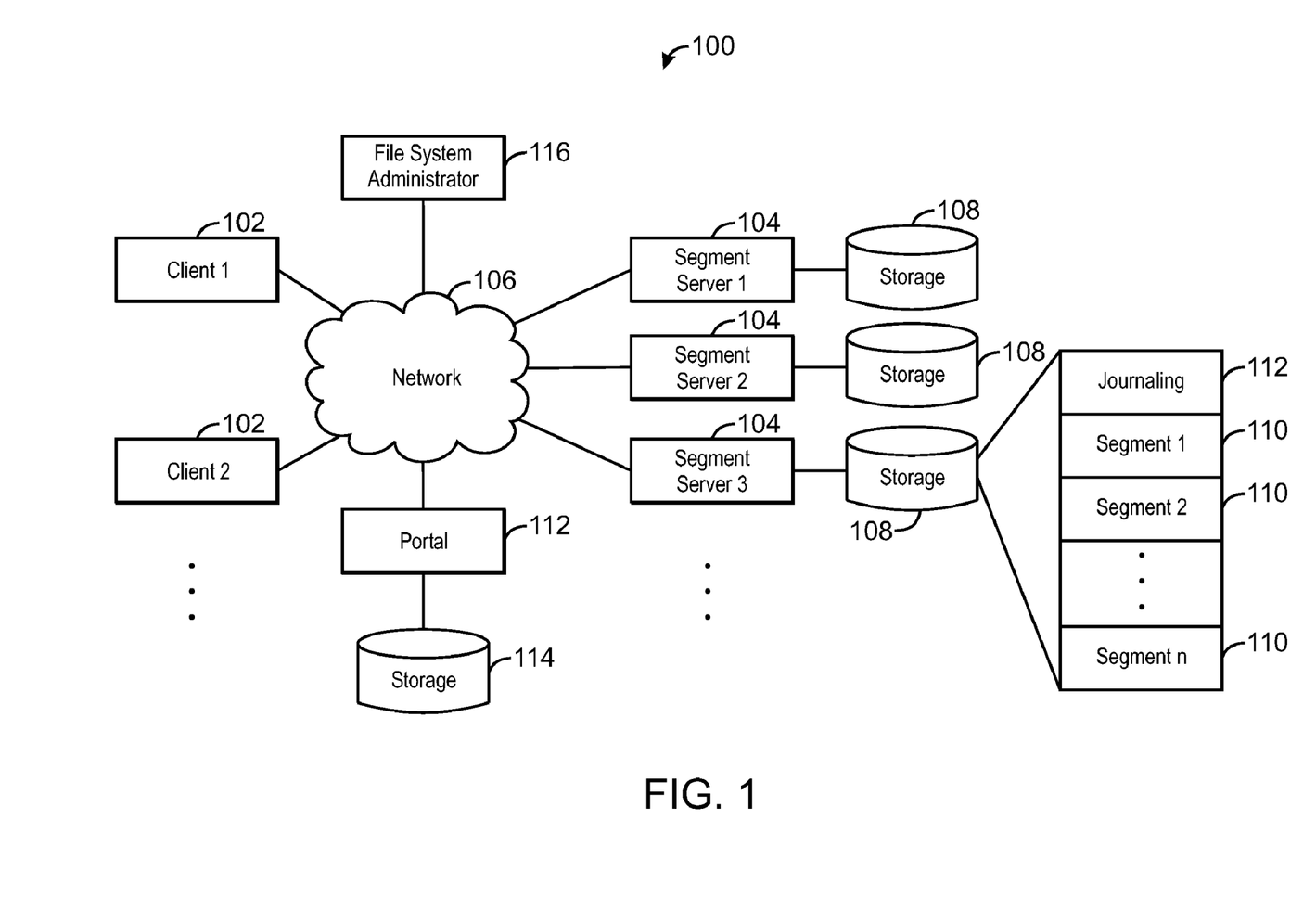
FIG. 1 is a block diagram of a computer network that employs a distributed file system, in accordance with exemplary embodiments of the present invention.

FIG. 1 is a block diagram of a computer network that employs a distributed file system, in accordance with exemplary embodiments of the present invention. The computer network 100 may include any number of clients 102 connected to any number of segment servers 104 through a network 106. Each client 102 may be a general-purpose computing device, for example, a desktop computer, laptop computer, a thin client, and the like. The network 106 may be any suitable form of computer network such as a local area network (LAN 128), a wide-area network (WAN), the Internet, or another network configuration. The network 106 can include routers, switches, modems, or any other kind of interface device used for interconnection.

The segment servers 104 may be any suitable type of server, for example, a business server, a database server, a virtual dedicated server, network attached storage (NAS), and the like. Furthermore, the computer network 100 may include a variety of different types of segment servers 104. Each segment server provides file system functions to the clients 102, for example, reading and writing files, inserting and deleting directory entries, renaming files, applying password protection to files, and the like. Each segment server 104 may be coupled to a storage device 108 for storing the data generated and used by the clients 102. The storage devices 108 may include any suitable form of storage media, for example, one of more hard disk drives, a redundant array of inexpensive disks (RAID), one or more flash drives, one or more optical drives, and the like. Furthermore, the computer network 100 may include different types of storage devices coupled to different servers 104.

The memory space of the storage devices 108 may be divided into units of memory referred to as segments 110. Each segment 110 may be a contiguous range of memory with any suitable size, for example, 512 gigabytes to 8 terabytes. Each storage device 108 may include any suitable number of segments 110 from one to several dozen, and the size and number of segments may vary between storage devices 108. Each segment 110 may be further divided into blocks such that files stored on the storage device 108 may be addressed by a segment number and a block number within the segment 110. Each storage device 108 may also include a memory map that lists each of the available segments 110 and the blocks where each segment 100 starts. Each storage device 108 may also include a contiguous memory space 112 that is reserved for journaling. The server-level journal record may be stored to the reserved memory space 112 of the storage device 108 and may include a circular journal log. As used herein, the term "journal record" refers to the distributed journal record that is used in accordance with the techniques described below to ensure file system integrity of the distributed file system. In some embodiments, each segment 110 may also include a "segment journal." As used herein, the term "segment journal" refers to a file that is used in accordance with known file journaling techniques to maintain data integrity within the particular segment with which it is associated.

The computer network may also include a portal 112 that provides an access point for the clients 102 to access the entire file system of the computer network 100. In some exemplary embodiments, the computer network 100 may include more than one portal 112 to provide more than one access point. Additionally, one or more of the segment servers 104 may also provide the functionality of a portal 112. In some embodiments, the portal 112 may also be coupled to a storage device 114 which may include any suitable form of storage media, for example, one or more hard disk drives, a redundant array of inexpensive disks (RAID), one or more flash drives, one or more optical drives, and the like. The storage device 114 may be used to store a journal record.

The portal 112 may receive file system requests. Requests that make modifications on multiple segment servers must be treated as a single transactional unit, referred to herein as a "transaction request". A transaction request may include a single file operation from the perspective of the client 102. For example, a transaction request may include creating a new file, renaming or resaving a file, creating a copy of a file, applying password protection to a file, reading a file, and the like. The portal 112 may translate each received transaction request into one or more "file operations," where each file operation accesses or modifies one file object residing in a single segment. Each transaction request may be translated into several file operations, some of which may apply to one or more segments 110 and one or more segment servers 104. When a transaction request involves more than one segment server 104, the transaction may be divided into several phases, wherein a phase refers to the file modifications executed by one of the segment servers 104 involved in the transaction. As used herein, a "transaction" is a complete set of modifications used to execute a single transaction request on all participating segments 110 and segment servers 104 through all phases of the transaction. For example, a hypothetical transaction may be translated into two file operations, wherein a first file operation creates a new file on a first segment 110 controlled by a first segment server 104 and a second file operation adds the file name of the file to a directory that resides on a second segment 110 controlled by a second segment server 104. The storage provided by the segment servers 104 may be combined into a common logical name space as viewed by the clients 102. A transaction sent from the client 102 may include a segment number which may be translated to determine a physical part of a storage medium of the file system corresponding to the transaction, for example, to determine the one or more specific segment servers 104 that control the applicable segments 110.

The computer network may also include a file system administrator 116 coupled to the network 106. The file system administrator 116 may include a memory map used for associating segments 110 with segment server identifiers. The portal 112 may access this memory map to translate each transaction into the one or more file operations. In some embodiments, segment server identifiers may include a server address, for example, a Media Access Control address (MAC address), Internet protocol (IP) address, and the like.

Each transaction may be identified by a unique sequence number. In this way, transactions may be identified and managed as a single unit even though the transaction may involve file data on multiple servers 104. When a client 104 initiates a transaction, the portal 112 assigns a unique sequence number to the transaction and sends appropriate file operations to each of the segment servers 104 involved in the transaction. In one exemplary embodiment, file operations may be carried out using Remote Procedure Calls (RPCs). Each RPC may include the unique sequence number and the data associated with the transaction, including file data and the one or more segment identifiers that determine the destination of the file data.

The distributed journaling techniques described herein enable the integrity of the distributed file system to be maintained in the event that a failure occurs in relation to the portal 112 or one or more of the segment servers 104 involved in the transaction. In an exemplary embodiment, several journal records will be stored in response to transactions that write data to the file system, such as adding data to a file, creating a new file, renaming an existing file, and the like. In exemplary embodiments, separate journal records may be stored by the portal 112 and each of the segment servers 104 involved in the transaction. Each of the journal records stored by the segment servers 104 may store the same information, such that any one of the journal records may be verified or repaired using the journal record from a different segment server 104. A file operation is referred to as "finished" when all data modifications associated with a file operation have been stored to the file journal of the segment server 104 associated with the file operation and flushed to the corresponding segment(s) 110. A transaction is referred to as "complete" when the journal records for each of the segment servers 104 involved in the transaction have been flushed to the segments 110 and the journal records have been deleted. A transaction may be completed when each one of the segment servers 104 involved in the transaction have sent a response to the portal 112 indicating that the corresponding file operation is finished. Exemplary embodiments of executing a transaction may be better understood with reference to FIG. 2.

Figure 2:
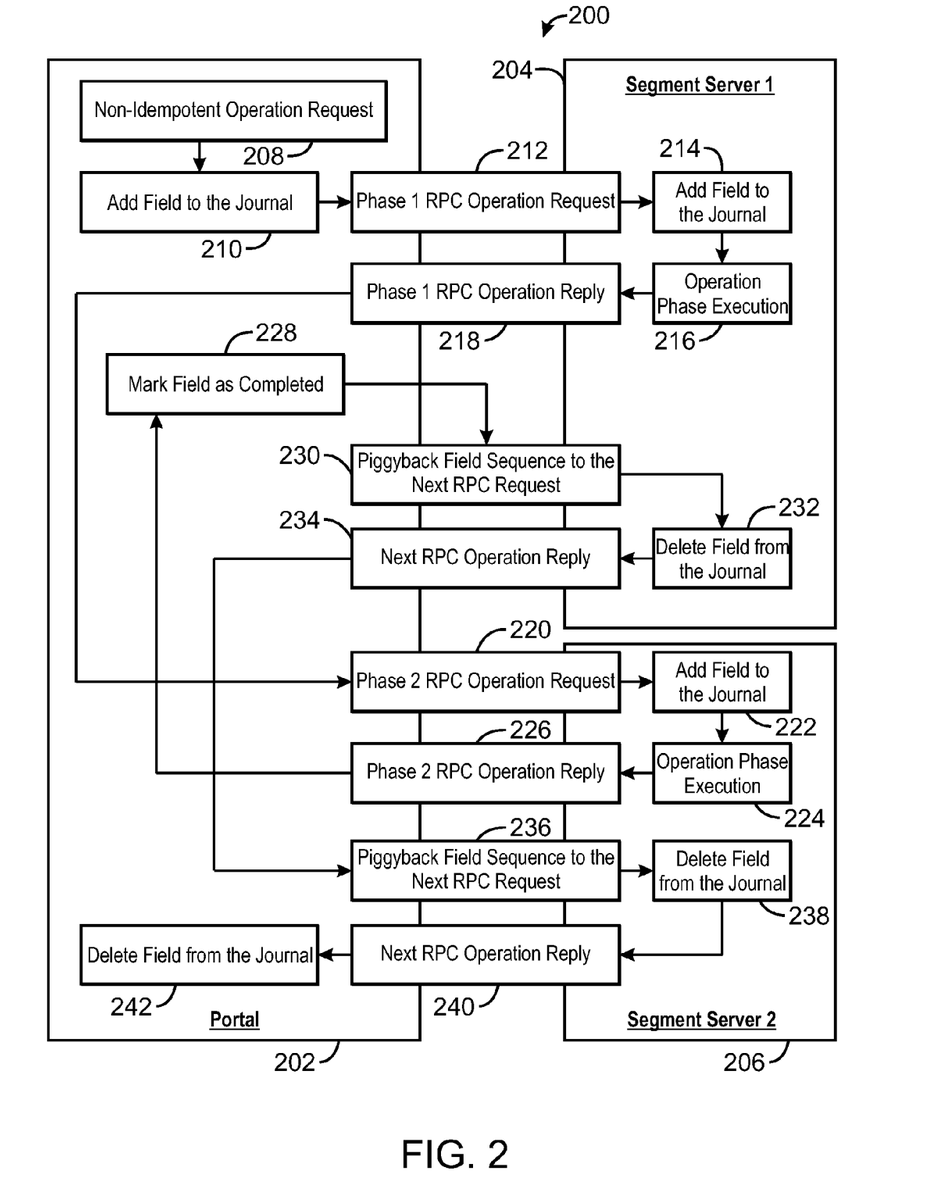
FIG. 2 is a process flow diagram for a method of executing a file system transaction, in accordance with exemplary embodiments of the present invention.

FIG. 2 is a process flow diagram for a method of executing a file system transaction, in accordance with exemplary embodiments of the present invention. The exemplary transaction shown in FIG. 2 involves a portal 202 which may correspond with the portal 112 shown in FIG. 1. The exemplary transaction also includes a first segment server 204 and a second segment server 206, each of which may correspond with one of the segment servers 104 shown in FIG. 1. Furthermore, the exemplary transaction occurs in two phases, wherein phase one operations are performed in conjunction with the first segment server 204 and phase two operations are performed in conjunction with the second segment server 206. Furthermore, it will be appreciated that the following transaction description may also be extended to multiple phase transactions involving any number of additional segment servers 104.

At block 208, the method 200 begins, wherein the client 102 sends a non-idempotent transaction request to the portal 202. As used herein, a "non-idempotent" transaction is a transaction which, if repeated, may return a system error. For example, writing data to a file may be considered an idempotent transaction because if the result of this write is unknown, the write can still be repeated. On the other hand a request to remove the file is non-idempotent because if the result of the remove request is unknown and the file was actually removed, repeat of the remove request would fail since the file no longer exists. The transaction request may include the file data involved in the transaction and one or more segment identifiers used to identify the destination segment(s) 110 of the file data. The portal 202 then identifies the segment servers 204, 206 involved in the transaction and generates file operations applicable to each of the segment servers 204, 206. The portal 202 also generates a unique sequence identifier and associates each of the transactions involved in the transaction with the same unique sequence identifier. The unique sequence identifier may be generated by incrementing the unique sequence identifier each time a new transaction request is received from a client 102.

At block 210, the portal 202 may generate a portal-level journal record, or "field," and add the journal record to the local journal, which may be stored in a memory device associated with the portal 202, for example, a flash drive or a hard disk. In some embodiments, the portal-level journal record may be stored in volatile memory, for example, random access memory (RAM).

At block 212, the portal 202 may send an RPC file operation request to the first segment server 204. The file operation request identifies type of file operation to be performed at the first segment sever 204, the file data involved in the operation, and the unique sequence identifier. At block 214, the file data associated with the file operation request is added to volatile memory on the first segment server 204. The segment server 204 then creates a server-level journal record, or "field," corresponding to the file data and adds the server-level journal record to the journal space of the first segment server 204, for example, to the memory space on the corresponding storage device 108 that has been reserved for the journal 112 (FIG. 1).

At block 216, the first phase of the transaction is executed on the first segment server 204. For example, the journal record may be flushed to the segment(s) 110 (FIG. 1) identified in the file operation request. Flushing the journal record to the segment 110 refers to reading the journal record and storing the file data contained in the journal record to the destination segment(s) 110 in which the persistent file data will reside. In some embodiments, each segment 110 involved in the transaction may also include a segment journal, in which case the flushing the journal record to the segment 110 may initiate the server-level file journaling, in accordance with known techniques.

At block 218, the first segment server 204 may send an RPC reply to the portal 202, indicating that the first phase of the transaction is "finished." This reply may be referred to as a "finished" message and indicates that the file data has been flushed from the journal 202 to the file segments(s) 110 or will be flushed to the file segments(s) 110 within a specified amount of time, for example, within approximately 5 to 15 minutes. After the "finished" message is received by the portal 202, the process flow may advance to block 220 wherein the next phase of the transaction is initiated at the second segment server 206.

At block 220, the portal 202 may send an RPC file operation request to the second segment server 206. The RPC file operation request identifies the file operation to be performed at the second segment sever 206, the file data involved in the file operation, and the same unique sequence identifier that was used in the first phase of the transaction. At block 222, the file data associated with the file operation request is added to volatile memory on the second segment server 206. The segment server 206 then creates another server-level journal record, or "field," corresponding to the file data and adds the journal record to the journal space of the second segment server 206, for example, to the memory space on the corresponding storage device 108 that has been reserved for the journal 112 (FIG. 1).

At block 224, the second phase of the transaction is executed on the second segment server 206. For example, the journal record may be flushed to the segment(s) 110 (FIG. 1) identified in the file operation request. As noted above, flushing the journal record to the segment(s) 110 may initiate the server-level file journaling.

At block 226, the second segment server 204 may send an RPC reply, or "finished" message, to the portal 202 indicating that the second phase of the transaction is finished. After the "finished" message is received from the last (in this case, second) segment server 206 involved in the transaction, the process flow may advance to block 228 wherein the portal 202 marks the transaction as "complete." At this time, each of the segment servers 204, 206 involved in the transaction has a journal record associated with the transaction and each segment server 204, 206 has confirmed that each phase of the transaction has finished. In other words, each segment server 204, 206 has successfully flushed its copy of the journal record to the corresponding segments 110. The portal 202 may then send "commit" messages to each of the segment servers 204, 206 informing the segment servers 204, 206 to delete or otherwise invalidate the journal records, also referred to as "committing" the journals. In some embodiments, network traffic may be reduced by combining commit messages with other network operations, a technique referred to as "piggybacking."

At block 230, the portal 202 may send a commit message to the first segment server 204. The commit message may identify the journal record to be committed by piggybacking the unique sequence identifier associated with the transaction onto the next RPC file operation request sent to the first segment server 204 in the ordinary course of communicating with the segment server 204. At block 232, the first segment server 204 may commit the journal record identified by the unique sequence identifier, for example, by deleting the journal record from the journal. At block 234, the first segment server 204 may send an RPC reply to the portal 202 that includes a confirmation message indicating that the identified journal record was successfully committed on the first segment server 204.

At block 236, the portal 202 may send a commit message to the second segment server 206. As noted above, the commit message may identify the journal record to be committed by piggybacking the unique sequence identifier associated with the transaction onto the next RPC file operation request sent to the second segment server 206 in the ordinary course of communicating with the second segment server 206. At block 238, the second segment server 206 may commit the journal record identified by the unique sequence identifier, for example, by deleting the journal record from the journal. At block 240, the second segment server 206 may send an RPC reply to the portal 202 that includes a confirmation message indicating that the identified journal record was successfully committed on the second segment server 206.

At this time, the portal 202 has received confirmation from both of the segment servers 204, 206 involved in the transaction that the journal records on each segment server 204, 206 were successfully committed. Next, at block 242, the portal-level journal record may be deleted from the journal associated with the portal 202. It will be appreciated that the transaction described herein is just one hypothetical file system transaction that may be executed in accordance with embodiments of the present invention. Other transactions may include a single segment server 104 or three or more segment servers 104. Furthermore, the steps described in relation to blocks 208 to 242 may be executed in any suitable order and may, in some cases occur simultaneously. For example, in some embodiments, the portal 202 may send the commit instruction to the second segment server 206 before the first segment server 204 or at essentially the same time. Furthermore, the portal 202 may send a commit message to the second segment server 204 without waiting for an RPC operation reply from the first segment server 204. Various other alterations to the process flow illustrated in FIG. 2 may also be included in exemplary embodiments of the present invention, depending on system design considerations, the number of segment servers 104 involved in the transaction, and the like.

In some cases, a hardware failure or other interruption may prevent one or more of the journal records from being committed after the transaction is complete. In this case, any uncommitted journal records will remain valid. Each time one of the segments servers 204, 206 reboots, any valid journal records may be replayed to update the corresponding segments 110. If the portal 202 has previously indicated that the corresponding transaction was completed, the replayed journal records may then be committed by their respective segment servers 204, 206. Otherwise, the journal records may remain valid until informed by the portal 202 that the related transaction is complete.

In some cases, the transaction may be interrupted before one of the journal records has been successfully flushed to the corresponding segment server 204, 206 or before a journal record has been successfully written to the corresponding journal. In that case, the transaction will not yet be marked as having been completed as shown at block 228. Thus, any finished journal records, in other words, journal records that have been successfully written to the corresponding segment server 204, 206, will still be valid. The file data in the valid, finished journal records may be used to verify and/or repair other unfinished journal records. An exemplary verification and repair method is described further in relation to FIG. 5. The initiation of the verification and repair method may be better understood with reference to the journal field state diagrams shown in FIGS. 3 and 4.

Figure 3:
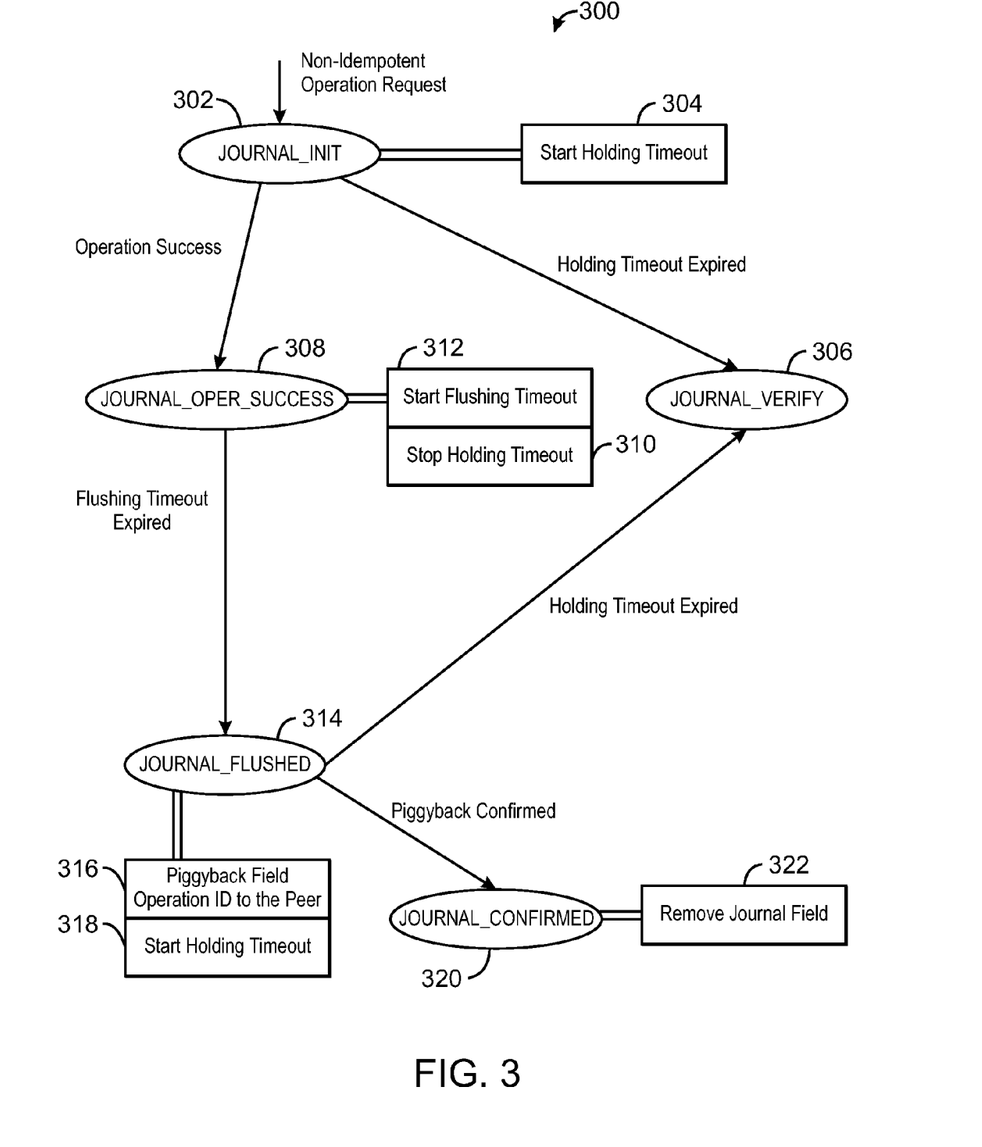
FIG. 3 is state transition diagram of a journal record on the portal, in accordance with exemplary embodiments of the present invention.

FIG. 3 is state transition diagram of a journal record on the portal, in accordance with exemplary embodiments of the present invention. The method 300 may begin at block 302, wherein the journal record is initiated when one of the clients 102 sends a non-idempotent transaction request to the portal 112. For the purpose of clarity, the method 300 describes a transaction that involves one segment server 104, in other words, a single-phase transaction. It will be appreciated that the method 300 may be expanded to include multiple-phase transactions. At block 302, portal 112 creates the portal-level journal record on the portal 112. Furthermore, after create the portal-level journal record, the portal 112 sends an RPC operation request to the segment server 104, which flushes the portal-level journal to the segment server 104. The portal 112 then initiates a holding timeout, as shown in block 304, and waits for a "finished" message from the segment server 104 that indicates that the RPC operation request was successful. A time period of the holding timeout may be in the range of approximately 15 minutes to 1 hour. If, at block 302, the holding timeout period expires, the process flow advances to block 306, wherein the verification and repair method may be initiated. If, however, the portal 112 receives the "finished" message before the expiration of the holding timeout period, the process flow may advance to block 308.

At block 308, the "finished" message has been received and the portal 112 terminates the holding timeout, as shown in block 310. The "finished" message indicates that the segment server 104 has received the operation request and created a server-level journal record, which will be flushed to the corresponding segments 110. The portal 112 then initiates a flushing timeout, as shown in block 312. The flushing timeout may provide a delay between receiving the "finished" message from the segment server 104 and the committing of the journal records involved in the transaction. A time period of the flushing timeout may be the range of approximately 10 seconds to 15 minutes. The segment server 104 may be configured to ensure that the flushing of the server-level journal record occurs within the time period of the delay. After the expiration of the flushing timeout period, the process flow may advance to block 314.

At block 314, the expiration of the flushing timeout indicates that the segment server 104 has successfully flushed the server-level journal record to the corresponding segments 110. The portal 112 may then mark the transaction as complete and the portal 112 may piggyback a "commit" message, which includes the unique sequence identifier, to the segment server 104, as shown in block 316. The portal 112 may also initiate a second holding timeout, as shown in block 318. A time period of the second holding timeout may be the range of approximately 15 minutes to 1 hour. The portal 112 then waits for a confirmation message from the segment server 104 that the segment server journal has been committed. If the second holding timeout period expires before the confirmation message is received from the segment server 104, the process flow may advance to block 306, wherein the verification and repair method may be initiated. If, however, the confirmation message is received from the segment server 104 before the expiration of the second holding timeout period, the process flow may advance to block 320.

At block 320, the transaction is complete and the segment server has confirmed to the portal that the segment server's copy of the journal record has been committed, in other words, flushed to the corresponding segments 110. The portal 112 may then commit the portal-level copy of the journal record, as shown at block 322.

Figure 4:
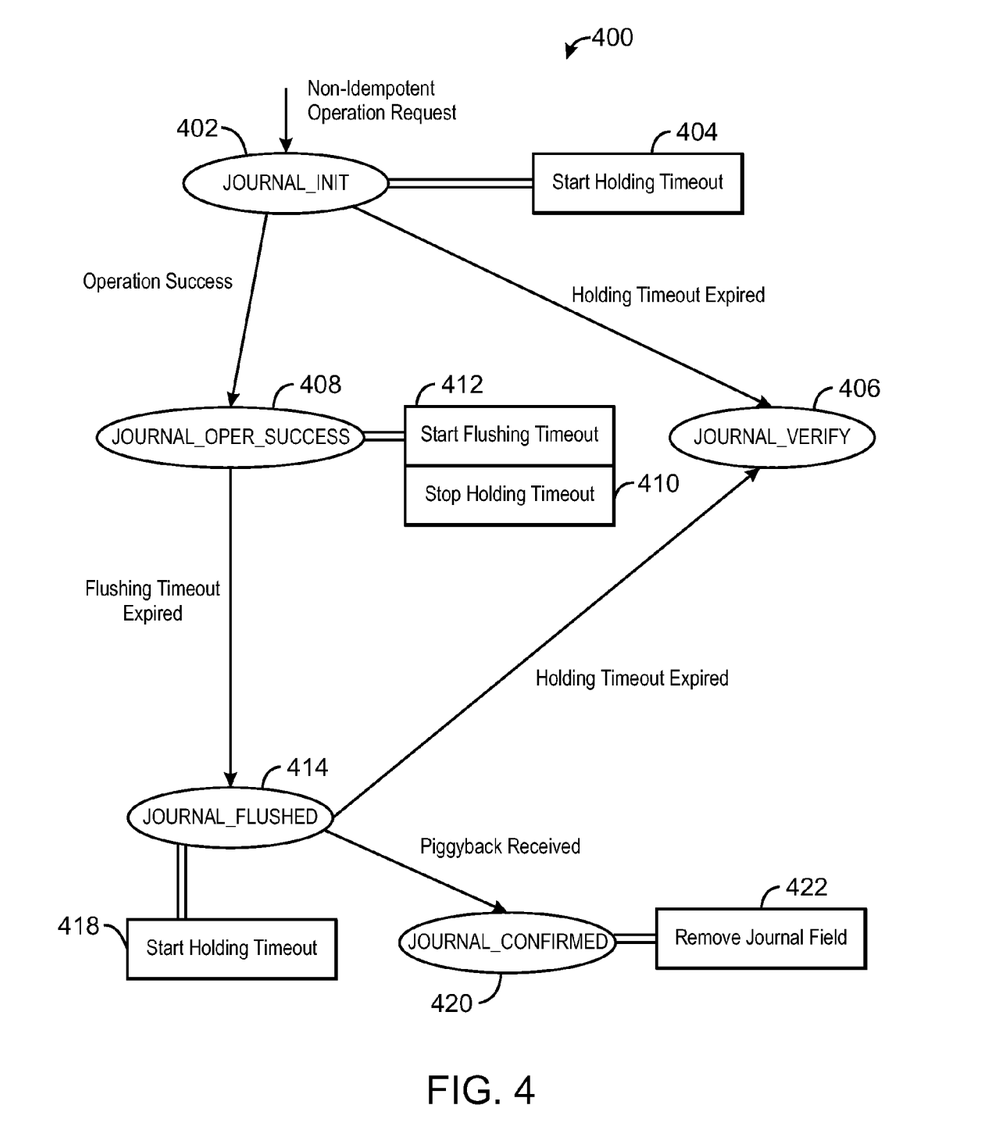
FIG. 4 is a state transition diagram of a journal record on the segment server, in accordance with exemplary embodiments of the present invention.

FIG. 4 is a state transition diagram of a journal record on the segment server, in accordance with exemplary embodiments of the present invention. The method 400 may begin at block 402, wherein the journal record is initiated when the portal 112 sends a non-idempotent file operation request to the segment server 104. At block 402, segment server 104 initiates a holding timeout, as shown in block 404, and begins creating the server-level journal record on the journal 112 of the storage device 108 corresponding to the segment server 104. A time period of the holding timeout may be in the range of approximately 15 minutes to 1 hour. If, at block 402, the holding timeout period expires, the process flow advances to block 406, wherein the verification and repair method may be initiated. If, however, the segment server 104 writes the journal record before the expiration of the holding timeout period, the process flow may advance to block 408.

At block 408, the segment server 104 has successfully created the server-level journal record and the segment server 104 terminates the holding timeout, as shown in block 410. The segment server 104 may also send a "finished" message to the portal 112, indicating that the requested file operation was successful. The segment server 104 may then initiate a flushing timeout, as shown in block 412, and begin flushing the server-level journal record to the corresponding segments 110. A time period of the flushing timeout may be the range of approximately 10 sec to 15 min. After the expiration of the flushing timeout period, the process flow may advance to block 414.

At block 414, the segment server 104 has finished flushing the server-level journal record to the segment(s) 110 identified by the client 102 in the transaction request, as discussed above in relation to FIG. 2. The segment server 104 may then initiate a second holding timeout, as shown in block 418. The segment server 104 may then wait for a piggybacked "commit" message from the portal 112. A time period of the second holding timeout may be the range of approximately 15 min to 1 hour. If the second holding timeout period expires before the "commit" message is received from the portal 112, the process flow may advance to block 406, wherein the verification and repair method may be initiated. If, however, the piggybacked "commit" message is received from the portal 112 before the expiration of the second holding timeout period, the process flow may advance to block 420.

At block 420, the segment server 104 commits its copy of the journal record, as shown at block 422. The segment server 104 then sends the confirmation message to the portal 112, indicating the journal record has been committed.

Figure 5:
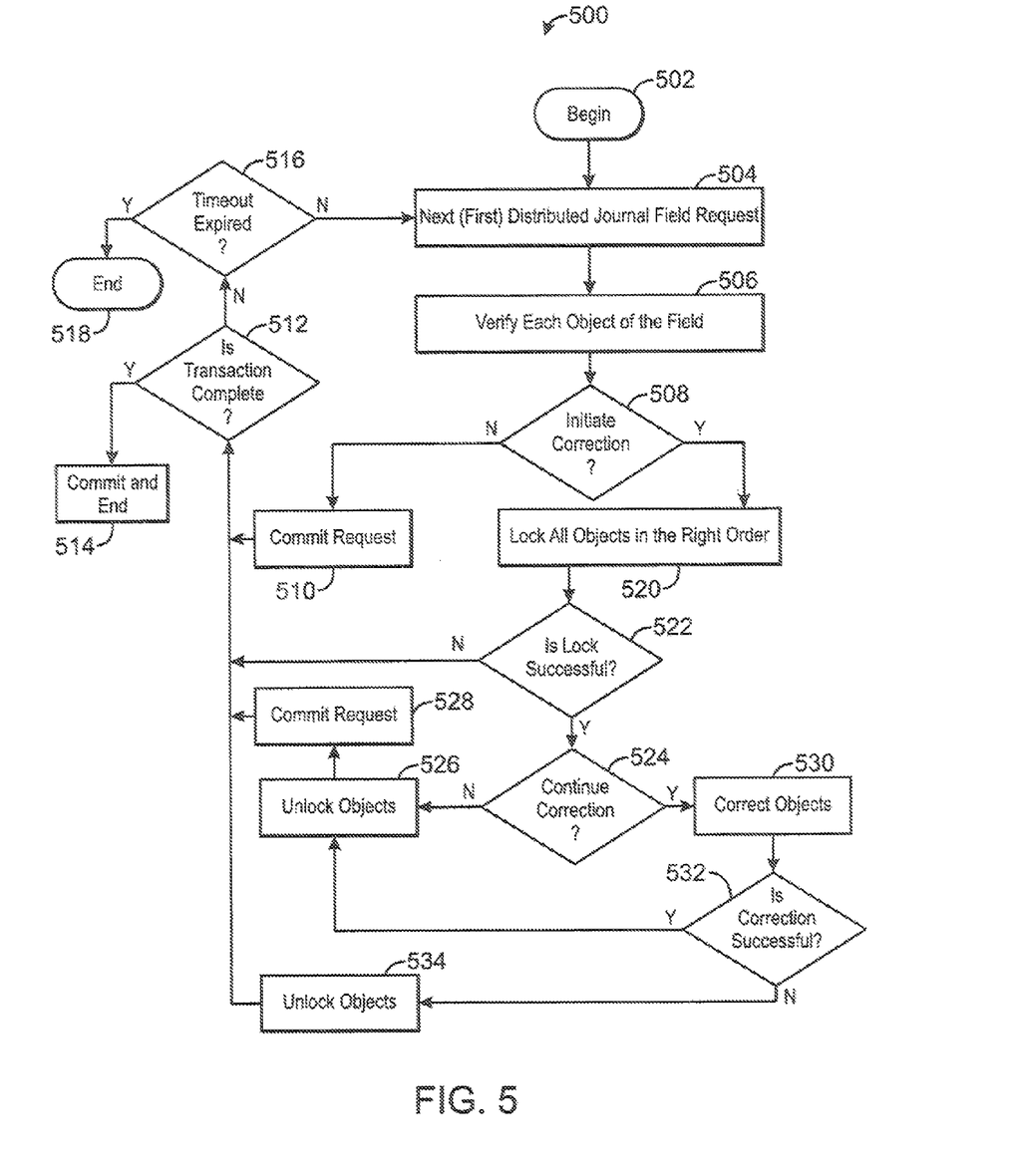
FIG. 5 is a process flow diagram of a verification and repair method stored on the destination segment server, in accordance with exemplary embodiments of the present invention.

FIG. 5 is a process flow diagram of a verification and repair method, in accordance with exemplary embodiments of the present invention. The verification and repair method 500 may performed by a self-healing module, which may run in the background on the portal 112 in user mode. The method 500 may begin at block 502, wherein the verification and repair method 500 is initiated by the portal 112 or one of the segment servers 104 involved in the transaction. In reference to FIG. 3, the verification and repair method 500 may be initiated by the portal 112 at block 306. In reference to FIG. 4, the verification and repair method 500 may be initiated by one of the segment servers 104 at block 406. Additionally, the verification and repair method 500 may be initiated if one of the segment servers 104 replays the journal record during reboot. Upon initiating the verification and repair method 500, the journal records created by each of the segment servers 104 involved in the corresponding transaction may be verified and possibly repaired.

At block 504, the self-healing module requests the journal record from one of the segment servers 104 and initiates a timeout period. Upon receiving a journal record one of the segment servers 104 involved in the transaction, the process flow may advance to block 506.

At block 506, each file object of the journal record may be verified. In some exemplary embodiments, the journal record may be verified by comparing the journal record with the files stored to the segment(s) 110 of the corresponding segment server 104. At block 508 a determination is made regarding whether correction of the file objects should be initiated. If the journal record and the files stored to the segment(s) 110 are consistent, the process flow may advance from block 508 to block 510, wherein the segment server 110 sends a commit request to the self-healing module, indicating that the journal record has been successfully flushed to the segment(s) 110.

The process flow may then advance to block 512, wherein a determination is made about whether the transaction is complete. If commit requests have been received from all of the segment servers 104 involved in the transaction, then the transaction is complete and the process flow may advance to block 514, which is discussed further below. Otherwise, the process flow may advance to block 516. At block 516, a determination is made about whether the timeout period has expired. If, at block 516, the timeout period is expired, the process may advance to block 518, which is discussed further below. Otherwise, the process flow may advance to block 504, wherein the wherein the self-healing module requests the journal record from one of the other segment servers 104.

Returning to block 508, if an inconsistency is detected between the server-level journal record and the files stored to the corresponding segment(s) 110, correction may be initiated and the process flow may advance from block 508 to block 520, wherein the self-healing module locks the file objects involved in the transaction. Locking the file objects enables the self-healing module to obtain exclusive access to the file objects during the repair procedure, thereby preventing the file system from accessing those file objects for other purposes such as writing new data to the file, and the like.

At block 522, a determination is made regarding whether the file objects have been successfully locked. If the file objects are not locked, this may indicate that the corresponding file objects may be involved in another ongoing process, for example, the segment server 104 may be replaying the journal record. If the lock was not successful, the process flow may advance from block 522 to block 512, discussed herein above.

If the lock was successful, the process flow may advance from block 522 to block 524, wherein the server-level journal record may be compared with the files stored to the segment(s) 110 of the corresponding segment server 104 to determine whether correction of the file objects should be continued. This additional verification process may be used because the related file objects may have been fixed by an operation that finished before the related file objects were locked. For example, the corresponding segment server 104 may have successfully replayed the journal record.

If, at block 524, the journal record and the files stored to the segment(s) 110 are determined to be consistent, the process flow may advance from block 524 to block 526, wherein the file objects may be unlocked. At block 528, the segment server 110 sends a commit request to the self-healing module, indicating that the journal record has been successfully flushed to the segment(s) 110. The process flow may then advance to block 512, discussed herein above.

If, at block 524, the journal record and the files stored to the segment(s) 110 are determined to be inconsistent, the correction may continue and the process flow may advance from block 524 to block 530. At block 530, the journal record and/or the file objects stored to the segments 110 may be repaired. In some embodiments, the self-healing module may compare the server-level journal record returned by the segment server 104 to the portal-level journal record stored on the portal 112 or one of the other server-level journal records generated by other segment servers 104 involved in the transaction. In some cases, the journal record itself may be incomplete or corrupted, in which case, the journal record may be repaired and flushed to the corresponding segment(s) 110. In some cases, the journal record may be uncorrupted, but not yet flushed to the segment(s) 110, in which case, the journal record may be replayed to the corresponding segment(s) 110.

At block 532, a determination is made regarding whether the correction was successful. If the correction was successful, the process flow may advance to block 526. As described above, the file objects are unlocked at block 526, the segment server 110 sends a commit request to the self-healing module at block 528, and the process flow advances to block 512, discussed herein above. If, at block 524, it is determined that the correction was not successful, then the process flow may advance to block 534, wherein the file objects are unlocked and the process flow returns to block 512, discussed herein above. The self-healing module may periodically repeat the attempt to verify and correct the journal transaction for the duration of holding timeout. If this holding timeout expires and all the attempts fail, a message may be sent to the administrator informing about possible corruption.

The verification and repair method 500 may continue until all of the segment servers 104 involved in the transaction have returned commit requests to the self-healing module or until the timeout period has expired. As discussed above in relation to block 512, if commit requests have been received from all of the segment servers 104 involved in the transaction, then the process flow advances to block 514. At block 514, the self-healing module may send a "commit" message to each of the corresponding segment server(s) 104. In response to the "commit" message, each segment server 110 may remove its copy of the committed transaction.

As discussed above in relation to block 516, if the timeout period expires, the process flow may advance to block 518. At block 518, the self-healing process terminates and a message may be sent to the administrator informing about possible corruption of the file system. Furthermore, each of the segment servers 104 involved in the transaction retains the journal records for uncommitted transactions.

Figure 6:
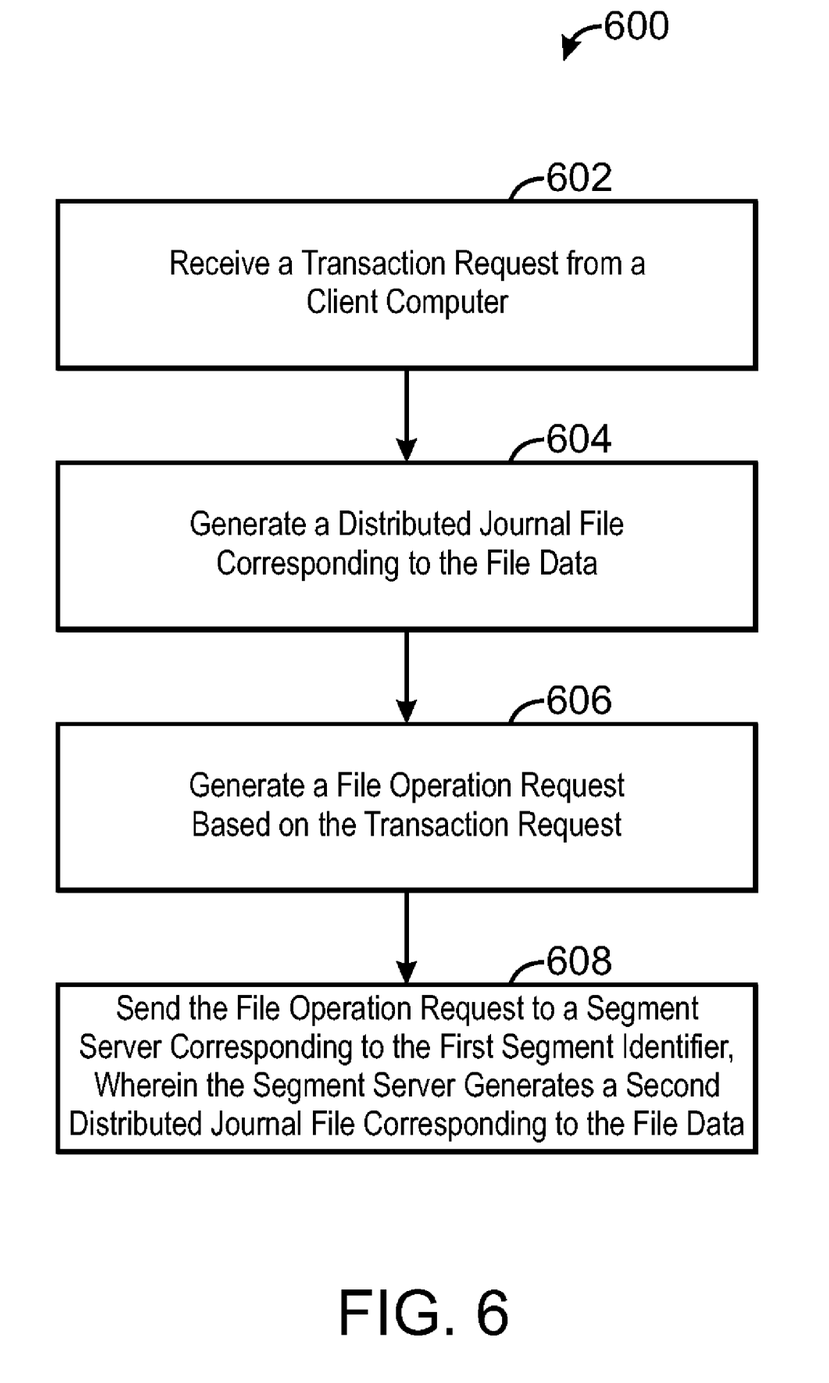
FIG. 6 is a process flow diagram of an overview of a method for storing file data to a distributed file system, in accordance with exemplary embodiments of the present invention.

FIG. 6 is a process flow diagram of an overview of a method for storing file data to a distributed file system, in accordance with exemplary embodiments of the present invention. The method is generally referred to by the reference number 600 and begins at block 602, wherein a transaction request is received from a client computer. In some exemplary embodiments, the transaction request is received by the portal that enables the client computer to access the distributed file system. The transaction request may include file data to be stored and one or more segment identifiers that determine the destination of the file data. The destination of the file data may include one or more segments, which may correspond with one or more segment servers. At block 604, a journal record corresponding to the file data may be generated and stored. In some exemplary embodiments, the journal record may be stored in a memory location associated with the portal. At block 606, a file operation request may be generated based on the transaction request. At block 608, the file operation request may be sent to the segment server corresponding to the segment identifier. In response to the file operation request, the first segment server may generate a second journal record corresponding to the file data on a memory device associated with the segment server.

Figure 7:
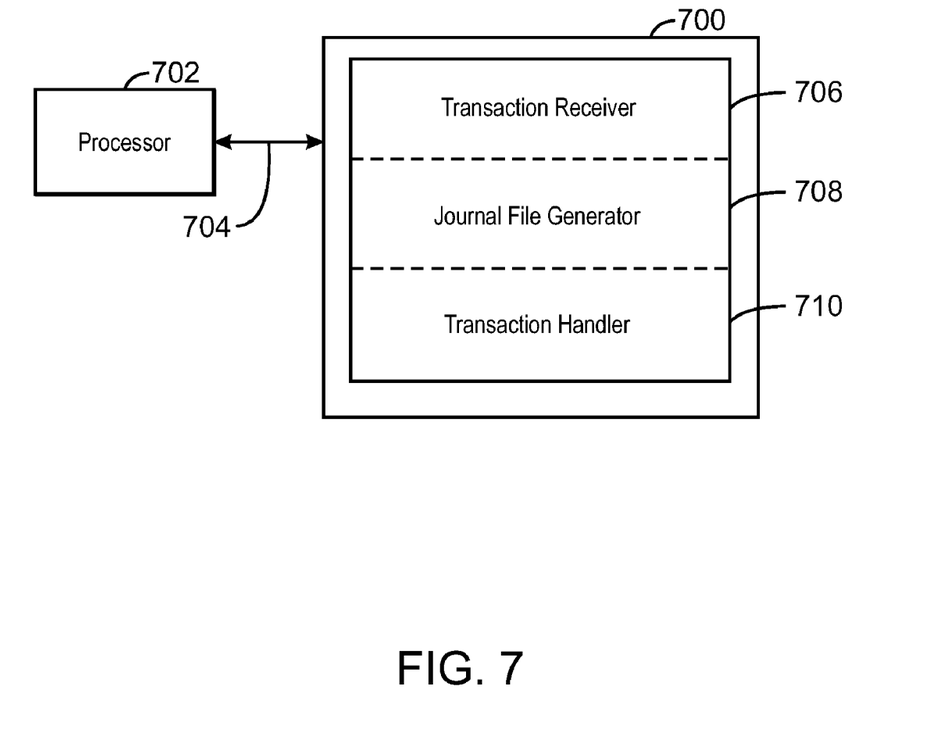
FIG. 7 is a block diagram showing a tangible, machine-readable medium that stores code configured to store file data to a distributed file system, in accordance with an exemplary embodiment of the present invention.

FIG. 7 is a block diagram showing a tangible, machine-readable medium that stores code configured to store file data to a distributed file system, in accordance with an exemplary embodiment of the present invention. The tangible, machine-readable medium is referred to by the reference number 700. The tangible, machine-readable medium 700 can comprise RAM, a hard disk drive, an array of hard disk drives, an optical drive, an array of optical drives, a non-volatile memory, a universal serial bus (USB) drive, a digital versatile disk (DVD), a compact disk (CD), and the like.

In some exemplary embodiments, the tangible, machine-readable medium 700 may be located in the portal that enables the client computer to access the distributed file system. In one exemplary embodiment of the present invention, the tangible, machine-readable medium 700 is accessed by a processor 702 over a communication path 704.

As shown in FIG. 7, the various exemplary components discussed herein can be stored on the tangible, machine-readable medium 700 and included in one or more instruction modules. As used herein, a "module" is a group of processor-readable instructions configured to instruct the processor to perform a particular task. For example, a first module 706 on the tangible, machine-readable medium 700 may store a transaction receiver configured to receive a transaction request from a client computer, wherein the transaction request includes file data to be stored and a segment identifier that determine a destination of the file data. A module 708 can include a journal record generator configured to store a journal record corresponding to the file data to the memory device. A module 710 can include a transaction handler configured to generate a file operation request based on the transaction request and send the file operation request to a segment server corresponding to the segment identifier, wherein the segment server is configured to generate a second journal record corresponding to the file data on a memory device associated with the segment server. The tangible, machine-readable medium 700 may also store additional exemplary components. For example, the tangible, machine-readable medium 700 may also include a self-healing module configured to verify and possibly repair the second journal record if any interruption of the transaction request is detected.

Although shown as contiguous blocks, the modules can be stored in any order or configuration. For example, if the tangible, machine-readable medium 700 is a hard drive, the modules can be stored in non-contiguous, or even overlapping, sectors. Additionally, one or more modules may be combined in any suitable manner depending on design considerations of a particular implementation. Furthermore, modules may be implemented in hardware, software, or firmware.

What is claimed is:

1. A method of processing a file system transaction in a distributed file system, comprising:
   receiving a transaction request from a computer, wherein the transaction request includes file data to be stored and a first segment identifier that determines a destination of the file data;
   generating a first distributed journal record corresponding to the file data; generating a first file operation request based, at least in part, on the transaction request;
   sending the first file operation request to a first segment server corresponding to the first segment identifier, wherein the first segment server generates a second distributed journal record corresponding to the file data on a memory device associated with the first segment server;
   receiving a "finished" message from the first segment server, indicating that the first segment server has flushed the second distributed journal record to a segment identified by the first segment identifier; and
   sending a "commit" message to the first segment server instructing the first segment server to commit the second distributed journal record.

2. The method of claim 1, wherein the transaction request includes a second segment identifier, the method comprising: generating a second file operation request based, at least in part, on the transaction request; and sending the second file operation request to a second segment server corresponding to the second segment identifier, wherein the second segment server generates a third distributed journal record corresponding to the file data on a memory device associated with the second segment server.

3. The method of claim 2, comprising:
   receiving "finished" message from the second segment server, indicating that the second segment server has flushed the third distributed journal record to a second segment identified by the second segment identifier; and
   sending a "commit" message to the second segment server instructing the second segment server to commit the third distributed journal record.

4. The method of claim 3, wherein the "commit" message is sent to the first and second segment servers only after "finished" messages are received from both the first and second segment servers.

5. The method of claim 2, comprising committing the first distributed journal record only after receiving a confirmation message from each of the first and second segment servers, wherein the confirmation message indicates that the respective segment server has committed its respective distributed journal record.

6. The method of claim 1, wherein a verification and repair method is initiated if an interruption of the transaction is detected.

7. The method of claim 6, comprising detecting an interruption of the transaction if a "finished" message is not received from the first segment server before a holding timeout period has expired, wherein the "finished" message indicates that the first segment server has flushed the second distributed journal record to the first segment identified by the first segment identifier.

8. The method of claim 6, comprising detecting an interruption of the transaction if the first segment server fails to send a confirmation message before a holding timeout period has expired, wherein the confirmation message indicates that the first segment server has committed the second distributed journal record.

9. The method of claim 1, comprising:
detecting an interruption of the transaction and initiating a verification and repair process comprising:
obtaining the second distributed journal record the from the first segment server;
comparing the second distributed journal record with a file object stored to the first segment server to determine whether the second distributed journal record is consistent with the file object; and
if the second distributed journal record is not consistent with the file object, attempting to lock the file object to obtain exclusive access to the file object.

10. The method of claim 9, wherein the verification and repair process further comprises:
if the file object is successfully locked, again comparing the second distributed journal record with the file object to determine whether the second distributed journal record is still not consistent with the file object;
if the second distributed journal record is again not consistent with the file object, repairing at least one of the second distributed journal record and the file object;
unlocking the file object; and receiving a commit request from the second segment server.

11. A distributed file system, comprising:
a processor that is configured to execute machine-readable instructions; and
a memory device that is configured to store instruction modules that are executable by the processor,
the instruction modules comprising:
a transaction receiver configured to receive a transaction request from a computer, wherein the transaction request includes file data to be stored and a segment identifier that determine a destination of the file data;
a journal record generator configured to store a first distributed journal record corresponding to the file data to the memory device; and
a transaction handler to:
generate a file operation request based, at least in part, on the transaction request;
send the file operation request to a segment server corresponding to the segment identifier;
receive a "finished" message from the segment server after the segment server flushes the second distributed journal record to a segment identified by the segment identifier; and
send a "commit" message to the segment server in response to the "finished" message, wherein the "commit" message instructs the segment server to commit the second distributed journal record, the segment server being a server to generate a second distributed journal record corresponding to the file data on a memory device associated with the segment server.

12. The distributed file system of claim 11, comprising a second segment server, wherein the transaction request includes a second segment identifier corresponding to the second segment server and the transaction handler is configured to send a second file operation request to the second segment server.

13. The distributed file system of claim 12, wherein the second segment server is configured to generate a third distributed journal record corresponding to the file data on a memory device associated with the second segment server, and wherein the second and third distributed journal records are redundant.

14. The distributed file system of claim 11, wherein the instructions comprise a self-healing module configured to perform verification and repair of at least one of the second distributed journal record and the file data if an interruption of the transaction is detected.

15. The distributed file system of claim 14, wherein the self-healing module is configured to:
compare the second distributed journal record with the file data stored to the first segment server to determine whether the second distributed journal record is consistent with the file data;
lock the file data to obtain exclusive access to the file data;
repair at least one of the second distributed journal record and the use data; unlock the file data; and
receive a commit request from the second segment server.

16. A non-transitory computer-readable medium, comprising code configured to direct a processor to:
receive a transaction request from a client computer, wherein the transaction request includes file data to be stored and a segment identifier that determine a destination of the file data
store a first distributed journal record corresponding to the file data to a memory device associated with the processor; generate a file operation request based, at least in part, on the transaction request and send the file operation request to a segment server corresponding to the segment identifier, wherein the segment server generates a second distributed journal record corresponding to the file data on a memory device associated with the segment server;
receive a "finished" message from the segment server after the segment server flushes the second distributed journal record to a segment identified by the segment identifier; and
send a "commit" message to the segment server in response to the "finished" message, wherein the "commit" message instructs the segment server to commit the second distributed journal record.

17. The non-transitory computer-readable medium of claim 16, comprising code configured to direct the processor to:
receive a confirmation message from the segment server indicating that the segment server has committed the second distributed journal record; and
commit the first distributed journal record in response to the confirmation message.

* * * * *

UNITED STATES PATENT AND TRADEMARK OFFICE
CERTIFICATE OF CORRECTION

PATENT NO.         : 8,296,358 B2
APPLICATION NO.    : 12/685237
DATED              : October 23, 2012
INVENTOR(S)        : Boris Zuckerman et al.

Page 1 of 1

It is certified that error appears in the above-identified patent and that said Letters Patent is hereby corrected as shown below:

In column 12, line 51, in Claim 3, delete "receiving" and insert -- receiving a --, therefor.

In column 13, line 20, in Claim 9, delete "record the" and insert -- record --, therefor.

In column 14, line 30, in Claim 15, delete "use" and insert -- file --, therefor.

In column 14, line 37, in Claim 16, delete "data" and insert -- data; --, therefor.

Signed and Sealed this
Second Day of April, 2013

Teresa Stanek Rea
*Acting Director of the United States Patent and Trademark Office*